United States Patent [19]
Mazzurco et al.

[11] Patent Number: 5,835,543
[45] Date of Patent: *Nov. 10, 1998

[54] DIGITAL DESYNCHRONIZER

[75] Inventors: Anthony Mazzurco; Ioan V. Teodorescu; Stewart W. Shankel, III, all of Plano; Richard C. Witinski, Allen; Pavlina Ennghillis, Plano; Harry W. Hartjes, Corinth, all of Tex.

[73] Assignee: DSC Communications Corporation, Plano, Tex.

[ * ] Notice: The term of this patent shall not extend beyond the expiration date of Pat. No. 5,699,391.

[21] Appl. No.: 895,143

[22] Filed: Jul. 16, 1997

Related U.S. Application Data

[63] Continuation of Ser. No. 456,235, May 31, 1995, Pat. No. 5,699,391.

[51] Int. Cl.$^6$ .................................................. H04L 7/00
[52] U.S. Cl. ............................ 375/372; 375/362; 270/516
[58] Field of Search .................................. 375/356, 362, 375/370, 371, 372, 373, 374, 377; 370/503, 505, 516, 506

[56] References Cited

U.S. PATENT DOCUMENTS

| | | | |
|---|---|---|---|
| 4,811,340 | 3/1989 | McEachern et al. | 370/505 |
| 5,052,025 | 9/1991 | Duff et al. | 375/371 |
| 5,119,406 | 6/1992 | Kramer | 375/371 |
| 5,200,982 | 4/1993 | Weeber | 375/371 |
| 5,268,936 | 12/1993 | Bernardy | 375/371 |
| 5,311,511 | 5/1994 | Reilly et al. | 370/465 |
| 5,337,334 | 8/1994 | Molloy | 375/371 |
| 5,343,476 | 8/1994 | Urbansky | 370/505 |
| 5,357,514 | 10/1994 | Yoshida | 370/505 |
| 5,367,545 | 11/1994 | Yamashita et al. | 375/371 |
| 5,404,380 | 4/1995 | Powell et al. | 375/363 |
| 5,457,717 | 10/1995 | Bellamy | 375/372 |

FOREIGN PATENT DOCUMENTS

| | | | |
|---|---|---|---|
| 9316535 | 8/1993 | Finland | H04J 3/06 |
| 9316536 | 8/1993 | Finland | H04J 3/06 |

OTHER PUBLICATIONS

Bregni, et al., "Jitter Testing Technique and Results at VC–4 Desynchronizer Output of SDH Equipment", IEEE 1994, pp. 1407–1410.

Hamlin, Jr., "Design and Performance Verification of A Sonet–to–DS3 Desynchronizer", IEEE 1991, pp. 0761–0764.

*Primary Examiner*—Tesfaldet Bocure
*Assistant Examiner*—Bryan Webster
*Attorney, Agent, or Firm*—Baker & Botts, L.L.P.

[57] ABSTRACT

A digital desynchronizer device (10) includes an elastic store unit (12) that receives data in an asynchronous manner and synchronously transmits the data in response to a synchronization clock generated by a clock generator (14). The clock generator (14) operates off of a reference oscillator unit (16). The clock generator (14) generates the synchronization clock signal in response to pointer adjustments identified by a pointer movement unit (18). The clock generator (14) also generates the synchronization clock signal in response to mapping jitter identified by a mapping unit (20). The pointer movement unit (18) and the mapping unit (20) identify pointer adjustments and mapping jitter, respectively, independent of each other. The clock generator (14) adjusts a width of a specific pulse bit in response to pointer adjustments identified by the pointer movement unit (18). Clock generator (14) also adjusts a width of a specific bit position, separate from the pulse bit position used for pointer adjustments, in response to mapping jitter identified by the mapping unit (20).

19 Claims, 3 Drawing Sheets

DIGITAL DESYNCHRONIZER

CROSS REFERENCE TO RELATED APPLICATIONS

This application is a continuation application of U.S. application Ser. No. 08/456,235, filed May 31, 1995 and entitled "Digital Desynchronizer," by Anthony (nmi) Mazzurco, Ioan V. Teodorescu, Stewart W. Shankel, III, Richard C. Witinski, Pavlina (NMI) Ennghillis, and Harry W. Hartjes, now U.S. Pat. No. 5,699,391, issued Dec. 16, 1997.

TECHNICAL FIELD OF THE INVENTION

The present invention relates in general to telecommunications switches and networks and more particularly to a digital desynchronizer.

BACKGROUND OF THE INVENTION

Within the synchronous optical network structure, traffic consisting of continuous signals are transported between network elements by mapping the signals into containers. As the payloads of the containers are passed from the originating point through network elements to the terminating point, they are remapped into other containers that are timed by different clocks. When the signal is eventually restored from the last container, there are instantaneous periods where the restored data may burst or carry no information. When the signal is returned to its original form, desynchronizers are used to create a continuous stream of bits at or close to the originating clock rate. Current desynchronizers use elastic storage of information where the storage level of the elastic store device defines the output of a phase lock loop used to regenerate the originating clock. Conventional desynchronizers control their phase lock loop with the elastic store level, making it difficult to separate out the effects of different types of jitter that exist simultaneously within the stored information. Therefore, it is desirable to have a desynchronizer that is capable of identifying and eliminating the effects of different jitter sources from the payload information.

From the foregoing, it may be appreciated that a need has arisen for a desynchronizer that identifies jitter from different sources in order to separate out the jitter effects from the payload information. A need has also arisen for a desynchronizer that can separately adjust a clock signal for each identified type of jitter.

SUMMARY OF THE INVENTION

In accordance with the present invention, a digital desynchronizer is provided that substantially eliminates or reduces disadvantages and problems associated with conventional desynchronizing devices.

According to an embodiment of the present invention, there is provided a digital desynchronizer that includes an elastic store unit operable to receive digital data at an asynchronous rate. The digital desynchronizer also includes a pointer unit operable to identify a pointer movement and a mapping unit operable to identify mapping jitter in the digital data within the elastic store unit. Identification of pointer movements and mapping jitter are performed independently of each other. A clock generator is operable to generate a clock signal and separately adjust the clock signal in response to the pointer movement and the mapping jitter such that digital data can be synchronously transmitted from the elastic store.

The present invention provides various technical advantages over existing desynchronizer devices. For example, one technical advantage is in independently identifying jitter caused by pointer movements and container mapping and attenuating said jitter independently, each with a unique transfer function. Another technical advantage is in separately adjusting a clock signal for the pointer movements and the mapping jitter in order to synchronously transmit the digital data from the elastic store. Yet another technical advantage is in adjusting a specific bit position of the clock signal associated with the pointer movement and the container mapping in order to eliminate the jitter caused by both of the sources. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
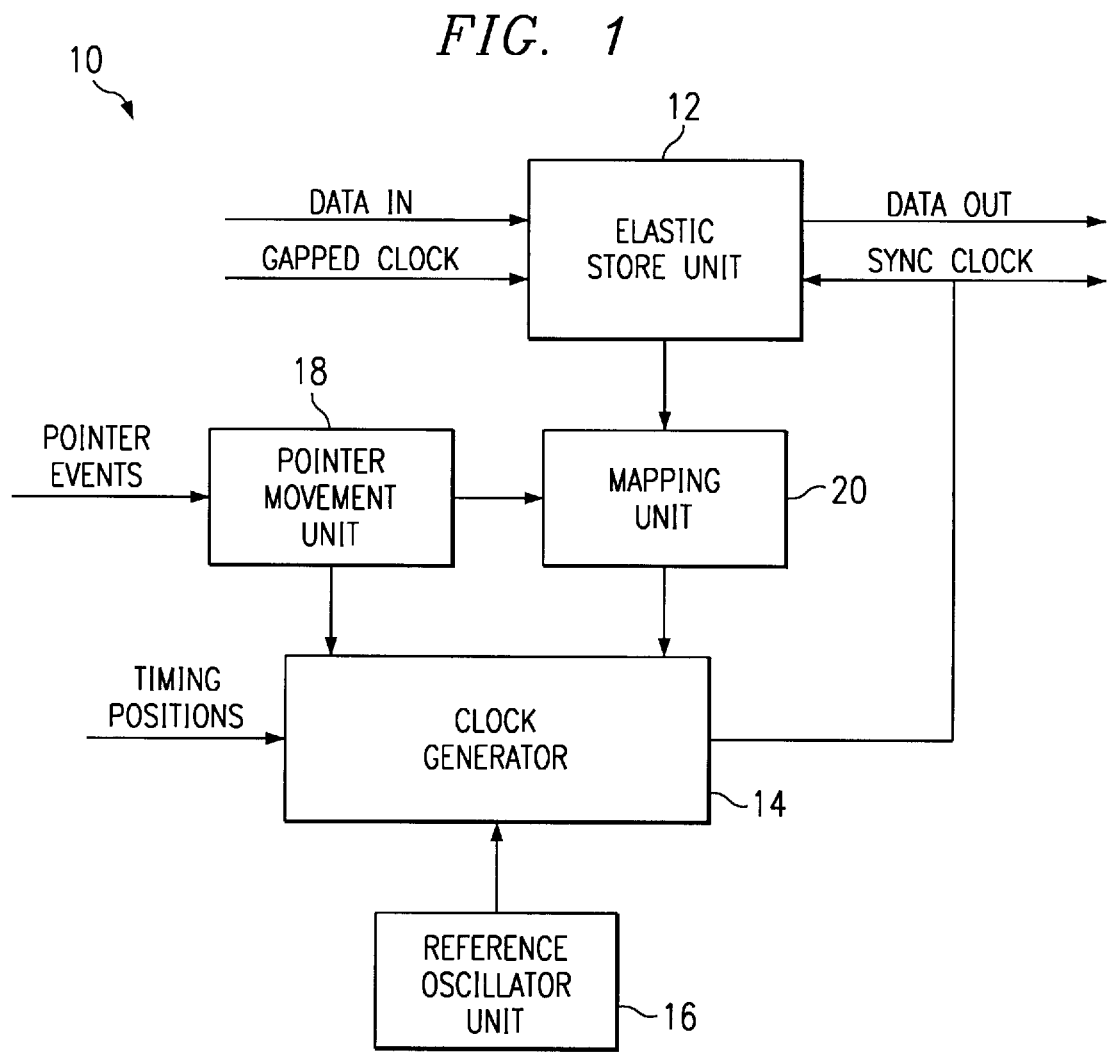
FIG. 1 illustrates a block diagram of the digital desynchronizer.

FIG. 1 is a block diagram of a digital desynchronizer 10. Digital desynchronizer 10 is used to retime an E1 signal extracted from a TU12 envelope by an external demapper device. Initially, the E1 signal was mapped into a VC12 container with VC12 overhead information. The VC12 container was mapped into a TU12 container with TU12 overhead information. The mapping into separate containers occurs during transportation of traffic between network elements in a telecommunications system.

Digital desynchronizer 10 includes an elastic store unit 12 that receives a DATA IN signal and a GAPPED CLOCK signal from an external demapper device. Information within elastic store unit 12 is transmitted over a DATA OUT signal in response to a SYNC CLOCK signal. The SYNC CLOCK signal is generated by a clock generator 14. A reference time base for clock generator 14 is supplied by a reference oscillator unit 16. Clock generator 14 adjusts the SYNC CLOCK signal in response to independent jitter determinations by a pointer movement unit 18 and a mapping unit 20. Pointer movement unit 18 provides a POINTER signal used by clock generator 14 to eliminate jitter caused by pointer movements in response to pointer events identified by and received from the external demapper. Mapping unit 20 provides a MAPPING signal used by clock generator 14 to eliminate mapping jitter in response to the information level within elastic store unit 12.

In operation, a demapped data stream extracted from its last container is loaded into elastic store unit 12 over the DATA IN signal by the GAPPED CLOCK signal, each received from the external demapper. The GAPPED CLOCK signal usually runs at the rate of the container and, though bursty in nature, has an average rate equal to the desired desynchronized clock. Information is clocked out of elastic store unit 12 over the DATA OUT signal with a time base generated by clock generator 14 over the SYNC CLOCK signal. Preferably, clock generator 14 takes the output from reference oscillator unit 16 running at sixteen times the nominal rate and divides the reference signal by sixteen to create each clock pulse. However, since the reference signal is most likely not equal to the desired clock rate, clock generator 14 has the ability to alter the width of specified clock pulses to be either 15/16 or 17/16 unit intervals. The specific pulse bits which may be altered are determined through the TIMING POSITIONS signal supplied by the external demapper.

Pointer movement unit 18 and mapping unit 20 determine when and if clock generator 14 alters the width of specific pulse bits of the SYNC CLOCK signal. Mapping unit 20 reads the level of elastic store unit 12 at a fixed known period and compares it to the level of elastic store unit 12 measured in the previous interval. Depending on whether the level of elastic store unit 12 is increased or decreased between intervals, clock generator 14 must either speed up the SYNC CLOCK signal by using clock pulse bits of 15/16 interval width or slow the SYNC CLOCK signal down using clock pulse bits of 17/16 interval width at specific timing positions of the SYNC CLOCK signal.

Mapping unit 20 calculates how many altered pulse bits must be created by clock generator 14. Mapping unit 20 determines the number of altered pulse bits based on an algorithm limiting the change in the number of width altering opportunities from one period to the next. This limitation is a direct result of a desired mapping jitter specification for digital desynchronizer 10. Mapping unit 20 supplies the number of width altering opportunities, to be taken at the specific timing positions, to clock generator 14 over the MAPPING signal. The width altering opportunities will be equally spaced over the period of time until the next mapping unit 20 interval.

In order to achieve separation between mapping jitter and pointer movement requirements, mapping unit 20 must make its calculation without accounting for pointer events that may have occurred. When a pointer event occurs, there is an instantaneous change of approximately eight bits in the elastic store level. The occurrence of the pointer event is provided to pointer movement unit 18 by the external demapper over the POINTER EVENTS signal. Pointer movement unit 18 accumulates the pointer occurrences and provides mapping unit 20 with a correction factor to add or subtract from the fill level read from elastic store unit 12. In this manner, mapping jitter and pointer movement jitter can be separately and independently removed from the output of digital desynchronizer 10.

Pointer movement unit 18 provides clock generator 14 with a POINTER signal such that the accumulated pointer data in elastic store unit 12 can be leaked out. The rate at which leaking can occur is defined by a desired jitter specification for pointer events. Pointer movement unit 18 provides information indicating how many bit adjustments must be made and in which direction, either plus or minus 1/16. Clock generator 14 alters the width of specific pulse bits of the SYNC CLOCK signal in response to the information from pointer movement unit 18. The pulse bits that are altered for pointer leaking are identified by the TIMING POSITION signal the from external demapper and are not the same as those identified and reserved for use by mapping unit 20. During the time the pointer effects are being leaked out, pointer movement unit 18 will modify the correction signal to mapping unit 20 so that the remaining unleaked data will not be factored into the calculations performed by mapping unit 20.

Figure 2:
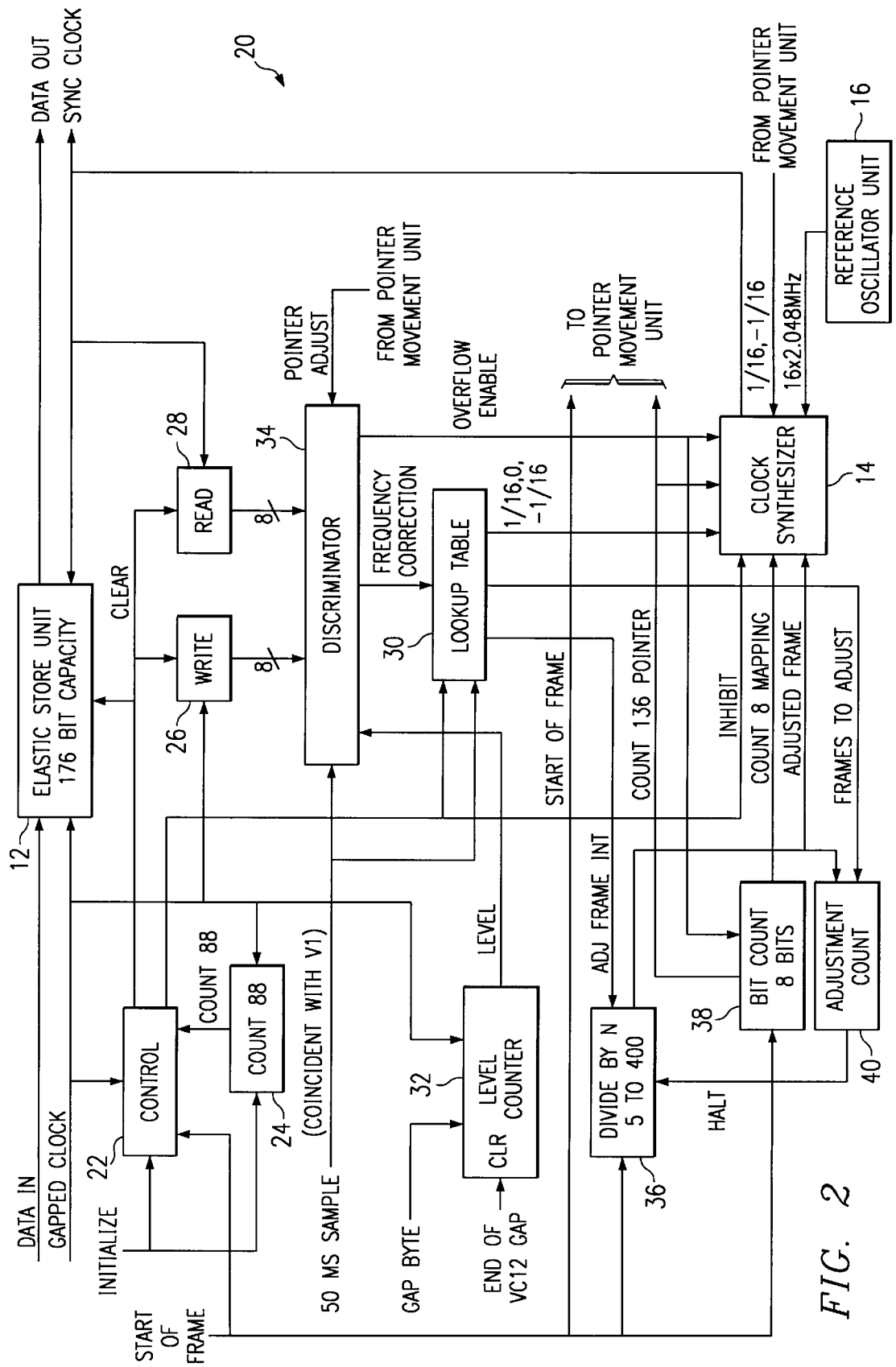
FIG. 2 illustrates a block diagram of a pointer movement unit and a mapping unit within the digital desynchronizer.

FIG. 2 is a block diagram of mapping unit 20. Operation of mapping unit 20 begins by activation of an INITIALIZE signal. The INITIALIZE signal is received at a control block 22 and at count 88 block 24. Control block 22 generates a CLEAR signal upon receipt of a START OF FRAME signal from the external demapper. The CLEAR signal is supplied to elastic store unit 12, to a write counter 26, and a read counter 28. Control block 22 also generates an INHIBIT signal that prevents clock synthesizer 14 from running until elastic store unit 12 reaches its initialized level. The INHIBIT signal is also used to preset a frequency adjustment lookup table 30 to an inactive state such that its indication to the clock synthesizer 14 gives no offsets in the first adjustment period.

Control of mapping unit 20 by the INITIALIZE signal deactivates when 88 bits are written into elastic store unit 12. Count 88 block 24 determines when 88 bits have been stored in elastic store unit 12 in response to the GAPPED CLOCK signal from the external demapper. Count 88 block 24 generates a COUNT 88 signal for control block 22 in order to change the state of the INHIBIT signal and place frequency adjustment lookup table 30 and clock synthesizer 14 into active operation. The number 88 was selected as being the minimum required initialized level within elastic store unit 12 that will not yield a buffer underflow regardless of the three byte VC12 overhead gap locations.

When a count of 88 is reached, all circuits within mapping unit 20 are released to run. Data can now be written into and read from elastic store unit 12 at a rate of 2.048 megabits per second. Sampling intervals coincide with a 50 MS SAMPLE signal from the external demapper that triggers the number of counters that supply information to clock synthesizer 14. Initially these counters will have no effect on the process due to the fact that frequency adjustment lookup table 30 was originally clear. Frequency adjustment lookup table 30 provides clock synthesizer 14 with the indication of how to adjust its clock count. Initially, frequency adjustment lookup table 30 provides a default signal at a continuous divide by sixteen rate.

During process execution, a level counter 32 calculates a target elastic store level. The target level of elastic store unit 12 is dependent on the phase change in the VC12 frame with respect to the TU12 frame. The nominal or ideal level of elastic store unit 12 at any point in time is a function of the relative phase relationship between the TU12 and VC12 frames. Assuming elastic store unit 12 sampling occurs at the TU12 overhead gap byte, the monitored level of elastic store unit 12 is at a minimum when the TU12 overhead gap byte follows a third byte of the VC12 overhead gap. This is based on the fact that the occurrence of a maximum four byte gap maximizes the depletion of elastic store unit 12 since there are no intervening payload bytes to add. Thus, for the situation where the TU12 overhead gap byte follows the VC12 overhead gap bytes, the level of elastic store unit 12 should be equal to the minimum initial reserve.

However there are other orientations in which the frames do not align in this manner that require determination of the level of elastic store unit 12. Level counter 32 performs an algorithm that determines the target level of elastic store unit 12. Level counter 32 receives an END OF VC12 GAP signal that clears its counter. When an intervening byte is a payload byte, level counter 32 adds 0.6875 its, or $0.1011_2$ binary, to its count in response to the GAPPED CLOCK signal. If the intervening byte is a gap byte, level counter 32 decrements its count by 7.3125 bits, or $111.0101_2$ binary, in response to a GAP BYTE signal from the external demapper. When the TU12 overhead gap byte is reached, level counter 32 stops performing adjustments to its count. The increment and decrement count values were determined by taking an average byte movement, arising from a pointer movement, for 35 VC12 bytes each carrying 256 E1 bits. Since this value comes to 256/35≈7.314 bits which is not readily convertible to binary form, the increment value was adjusted to offset the difference between the desired byte movement of 7.314 bits and the binary representation of 7.3125 bits.

In order to adjust for mapping jitter, the target level of elastic store unit 12 determined by level counter 32 is compared to write counter 26 and read counter 28 by a discriminator 34. Discriminator 34 compares the write and read counts to find a fill level for elastic store unit 12. This fill level is compared to the target level of elastic store unit 12 calculated by level counter 32. The target level is determined by reading the count stored in level counter 32, subtracting out the number currently stored within pointer movement unit 18 received from a POINTER ADJUST signal in order to mask out the effects of pointer movements, and adding a forty-bit margin as a result of the effects of bit stuffing, pointer adjustments, and clock differences. The result of this comparison yields a new frequency correction that is provided by discriminator 34 to frequency adjustment lookup table 30.

Frequency adjustment lookup table 30 is programmed to provide the direction and frequency of corrections in response to a FREQUENCY CORRECTION signal from discriminator 34. Frequency adjustment lookup table 30 provides a direction of the correction to clock synthesizer 14. The frequency of the correction is translated as a frame interval and supplied to a divide by N COUNTER 36. Divide by N COUNTER 36 divides the frame count down by a modulus N and provides an ADJUSTED FRAME signal to clock synthesizer 14 that indicates when the appropriate frame has been reached. Clock synthesizer 14 makes a correction in the current frame in response to the ADJUSTED FRAME signal and modifies one pulse bit in the frame. A bit counter 38 determines which pulse bit in the frame is to be modified. In this example, clock synthesizer 14 modifies the eighth bit of the frame.

Not every correction interval will happen to be a factor of four hundred. For this reason, an adjustment counter 40 counts the actual number of adjustments made in the sampling interval. When frequency adjustment lookup table 30 supplies an interval count, a rounding up of the number is performed to guarantee that the correct number of corrections can be made. Adjustment counter 40 halts the operation of divide by N counter 36 before too many corrections are produced in response to a FRAMES TO ADJUST signal from frequency adjustment lookup table 30 and the ADJUSTED FRAME signal from divide by N counter 36. Clock synthesizer 14 divides a source clock from reference oscillator unit 16 by 15, 16, or 17 in response to the frequency and direction of corrections necessary to eliminate the mapping jitter.

Discriminator 34 provides an additional signal to clock synthesizer 14. An OVERFLOW ENABLE signal becomes active whenever elastic store unit 12 is approaching its capacity either positive or negative. When that situation occurs, clock synthesizer 14 will perform adjustments on every frame until the level of elastic store unit 12 is brought back to a safe level. This condition can happen if the input clock is out of specification or its frequency is changing at an excessive rate. During this condition, characteristics of the SYNC CLOCK signal will be out of specified tolerances, but no data will be lost. Preferably a level of approximately ten bits from the overflow/underflow condition is used. This provides sufficient margin for a reasonable offset of about one hertz per second.

Figure 3:
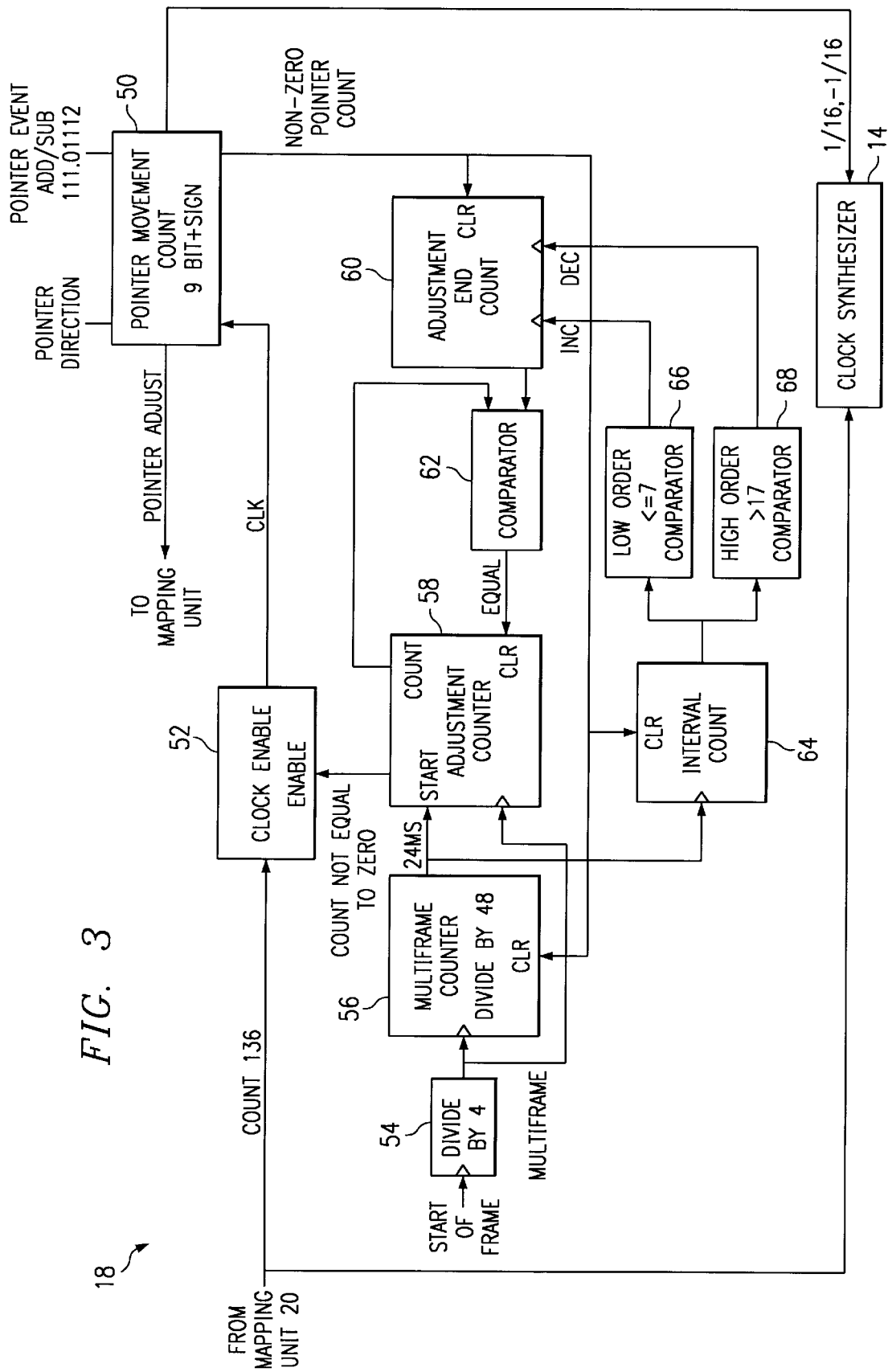
FIG. 3 illustrates a block diagram of a pointer adjustment controller within the digital desynchronizer.

FIG. 3 is a block diagram of pointer movement unit 18. Pointer movement unit 18 receives a POINTER EVENT signal and a POINTER DIRECTION signal at a pointer movement counter 50 from the external demapper whenever a pointer movement occurs. Pointer movement counter 50 will either add or subtract 7 and $7/16$ bits, $111.0111_2$ in binary, from its current value according to the value of the POINTER DIRECTION signal. The value of 7 and $7/16$ bits for pointer movements was chosen for ease of binary arithmetics and rounding off purposes. Pointer movement counter 50 supplies a CORRECTION signal to clock synthesizer 14 in order to make a $1/16$ bit correction in the direction designated by the POINTER DIRECTION signal. The bit correction is made to the 136th E1 bit after the start of the frame and is determined by the COUNT 136 signal received from bit counter 38 of mapping unit 20 at a clock enable block 52. The selection of the 136th bit was made as being ½ frame away from the correction bit made for the mapping jitter. After bit counter 38 reaches a count of 136, it may continue to free run as long as it is designed not to wrap around to a count of eight before the next frame starts. Clock enable block 52 provides a CLK signal to pointer movement counter 50 in order to generate the CORRECTION signal to clock synthesizer 14. The clock synthesizer compares the adjusted polarity of the 136th bit with the adjusted polarity of the 8th bit. If they are opposite, the bit adjustments to the clock periods for that frame are not made in order to reduce overall jitter.

The remaining circuitry of pointer mapping unit 18, provides a control signal for clock enable block 52 in order to supply the CLK signal to pointer movement counter 50. The START OF FRAME signal from the external demapper is received at a divide by four block 54. Divide by four block 54 processes the start of frame signal in order to obtain a MULTIFRAME indication signal. The MULTIFRAME indication signal is provided to a multi-frame counter 56 and an adjustment counter 58. Multi-frame counter 56 generates a twenty-four microsecond signal for adjustment counter 58. Adjustment counter 58 counts up to the value found within an adjustment end count register 60. A comparator 62 compares the value within adjustment counter 58 to the value within adjustment end count register 60. Once adjustment counter 58 reaches the value of adjustment end count register 60 as determined by comparator 62, the value within adjustment counter 58 is cleared. Initially, the value of adjustment end count register 60 starts at zero and is updated every 24th subframe based on the count of an interval counter 64. For the first seven intervals, the value of adjustment end counter register 60 is increased in response to a lower comparator 66. For the intervals from 7 to 17, the value of adjustment end count register 60 does not change. After the 17th interval, the value of adjustment end count register 60 is decremented in response to high order comparator 68. When the value within pointer movement counter 50 reaches zero, multi-frame counter 56 and adjustment end count register 60 are cleared to zero by a non-zero pointer count signal.

The effect of the CLK signal to pointer movement counter 50 is to increment or decrement the counter's contents by $1/17$th of a bit. The direction of the process is always towards zero corresponding to the direction of the CORRECTION SIGNAL for clock synthesizer 14. If pointer movement counter 50 initially has one pointer movement 7, or $111.0111_2$, pointer movement counter 50 will be cleared out after subtracting $0.0001_2$ one hundred and nineteen times corresponding to the number of corrections required to leak out pointer adjustments. Clock synthesizer 14 spreads out this number of corrections across the entire set of frames. One hundred and nineteen corrections were chosen to provide a uniform ramping up and ramping down over an acceptable adjustment interval.

In summary, a digital desynchronizer includes a mapping unit and a pointer movement unit that independently identify mapping jitter and pointer adjustments. The mapping unit and the pointer movement unit provide signals to a clock synthesizer in order that the clock synthesizer can generate a synchronization clock signal, that approximates the source clock, to transmit data from an elastic store unit. The clock synthesizer adjusts a specific bit position to compensate for mapping jitter identified by the mapping unit. The clock synthesizer also adjusts a separate bit position in response to pointer adjustments identified by the pointer movement unit. In this manner, the digital desynchronizer provides a separate facility for leaking out pointer adjustments independent of the jitter caused by desynchronizing the effects of mapping.

Thus, it is apparent that there has been provided, in accordance with the present invention, a digital desynchronizer that satisfies the advantages set forth above. Although the preferred embodiment has been described in detail, it should be understood that various changes, substitutions, and alterations can be made herein. For example, though specific increment and decrement values and specific network signals are used, different values may be used for different signals in order to achieve an appropriate synchronized clock signal for instances that include a DS3 signal mapped into an STS-1. Other examples are readily ascertainable by one skilled in the art and can be made without departing from the spirit and scope of the present invention as defined by the following claims.

What is claimed is:

1. A digital desynchronizer, comprising:
   an elastic store unit operable to receive digital data at an asynchronous rate;
   a pointer unit operable to identify a pointer movement in said digital data;
   a mapping unit operable to identify mapping jitter in said digital data; and
   a clock generator operable to separately receive said pointer movement said pointer unit and said mapping jitter from said mapping unit, said clock generator operable to generate a clock signal, said clock signal operable to synchronously transmit said digital data from said elastic store, said clock generator operable to adjust specific pulse bit positions of said clock signal in response to separate determinations of said pointer movement and said mapping jitter, respectively.

2. The digital desynchronizer of claim 1, wherein said clock generator is operable to generate said clock signal in frame intervals, said clock generator operable to adjust a first pulse bit position of each frame interval in response to said pointer movement, said clock generator operable to adjust a second pulse bit position of each frame interval in response to said mapping jitter.

3. The digital desynchronizer of claim 2, wherein said first pulse bit position is each eighth pulse bit position of every frame interval.

4. The digital desynchronizer of claim 2, wherein said second pulse bit position is each one hundred thirty-sixth pulse bit position of every frame interval.

5. The digital desynchronizer of claim 2, wherein said clock generator increases, decreases, or retains a pulse bit width of said first and second pulse bit positions in response to said pointer movement and said mapping jitter, respectively.

6. The digital desynchronizer of claim 1, wherein said pointer unit provides said pointer movement to said mapping unit, said mapping unit eliminating the effect of said pointer movement in determining said mapping jitter.

7. The digital desynchronizer of claim 1, wherein said mapping unit calculates a target fill level for said elastic store unit, said mapping unit comparing said target fill level to a previous fill level of said elastic store unit in order to determine said mapping jitter.

8. The digital desynchronizer of claim 1, wherein said pointer unit provides said pointer movement to said clock generator such that said clock generator spreads out the effect of said pointer movement across an entire set of frame intervals.

9. The digital desynchronizer of claim 1, wherein said mapping unit prevents said elastic store unit from reaching an overflow and an underflow threshold fill level.

10. A method of eliminating jitter in digital data of a telecommunications signal, comprising the steps of:
    identifying a pointer movement in the digital data independent of mapping jitter in the digital data;
    identifying mapping jitter in the digital data independent of a pointer movement in the digital data; and
    generating a clock signal in frame intervals, specific pulse bit positions of the clock signal being adjusted in response to separate determinations of the pointer movement and the mapping jitter, the clock signal synchronously transmitting the digital data without jitter caused by the pointer movement and the mapping jitter.

11. The method of claim 10, comprising the steps of:
    adjusting a first pulse bit position of the clock signal in response to the pointer movement; and
    adjusting a second pulse bit position of the clock signal in response to the mapping jitter.

12. The method of claim 11, wherein said adjusting steps include increasing or decreasing a width of the first and second pulse bit positions.

13. The method of claim 10, wherein said mapping jitter identifying step includes:
    calculating a target fill level of a memory containing the digital data;
    comparing the target fill level with a previous fill level of the memory; and
    eliminating the effect of the pointer movement from the actual fill level.

14. The method of claim 10, wherein said clock signal generating step includes spreading out the pointer movement across an entire set of frame intervals.

15. A digital desynchronizer, comprising:
    an elastic store unit operable to receive digital data at an asynchronous rate;
    a pointer unit operable to identify a pointer movement in said digital data independent of mapping jitter in said digital data;
    a mapping unit operable to identify mapping jitter in said digital data independent of pointer movements in said digital data, wherein said pointer unit provides said pointer movement to said mapping unit, said mapping unit eliminating the effect of said pointer movement in determining said mapping jitter; and
    a clock generator operable to separately receive said pointer movement from said pointer unit and said mapping jitter from said mapping unit, the clock generator operable to generate a clock signal, said clock signal operable to synchronously transmit said digital data from said elastic store, said clock generator operable to adjust specific pulse bit positions of said clock signal in response to separate determinations of said pointer movement and said mapping jitter, wherein said clock generator is operable to generate said clock signal in frame intervals, said clock generator operable to adjust a first pulse bit position of each frame interval in response to said pointer movement, said clock generator operable to adjust a second pulse bit position of each frame interval in response to said mapping jitter.

16. The digital desynchronizer of claim 15, wherein said first pulse bit position and said second pulse bit position are separated by half a frame length.

17. The digital desynchronizer of claim 15, wherein said first pulse bit position is each eighth pulse bit position of every frame interval, and wherein said second pulse bit position is each one hundred thirty-sixth pulse bit position of every frame interval.

18. The digital desynchronizer of claim 15, wherein said mapping unit calculates a target fill level for said elastic store unit, said mapping unit comparing said target fill level to a previous fill level of said elastic store unit in order to determine said mapping jitter.

19. The digital desynchronizer of claim 15, wherein said pointer unit provides said pointer movement to said clock generator such that said clock generator spreads out the effect of said pointer movement across an entire set of frame intervals.

* * * * *